United States Patent
Huettenbrenner et al.

(10) Patent No.: US 10,589,698 B2
(45) Date of Patent: Mar. 17, 2020

(54) HEAT SHIELD FOR A HEAT- AND SOUND-RADIATING COMPONENT IN A MOTOR VEHICLE

(71) Applicant: Bayerische Motoren Werke Aktiengesellschaft, Munich (DE)

(72) Inventors: Alexander Huettenbrenner, Steyr (AT); Christian Veit, Steyr (AT); Robert Hollnbuchner, Garsten (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 81 days.

(21) Appl. No.: 15/786,673

(22) Filed: Oct. 18, 2017

(65) Prior Publication Data
US 2018/0043845 A1 Feb. 15, 2018

Related U.S. Application Data

(63) Continuation of application No. PCT/EP2016/061790, filed on May 25, 2016.

(30) Foreign Application Priority Data

Jun. 8, 2015 (DE) .................. 10 2015 210 413

(51) Int. Cl.
*B60R 13/08* (2006.01)
(52) U.S. Cl.
CPC ...... *B60R 13/0876* (2013.01); *B60R 13/0838* (2013.01); *B60R 13/0884* (2013.01); *B60R 2013/0807* (2013.01)
(58) Field of Classification Search
CPC . B60R 13/0815; B60R 13/08; B60R 13/0838; B60R 13/0861; B60R 13/083; B60R 5/04; B60R 13/0846
(Continued)

(56) References Cited

U.S. PATENT DOCUMENTS 8,371,635 B2 * 2/2013 Mizata ................. G10K 11/168
156/307.1
2006/0103171 A1 5/2006 Blomeling et al.
(Continued)

FOREIGN PATENT DOCUMENTS

CN 101460338 A 6/2009
CN 204037483 U 12/2014
(Continued)

OTHER PUBLICATIONS

International Search Report (PCT/ISA/210) issued in PCT Application No. PCT/EP2016/061790 dated Aug. 8, 2016 with English translation (five pages).

(Continued)

*Primary Examiner* — D Glenn Dayoan
*Assistant Examiner* — Sunsurraye Westbrook
(74) *Attorney, Agent, or Firm* — Crowell & Moring LLP

(57) ABSTRACT

The invention provides a heat shield for a heat- and sound-radiating component in a vehicle. The heat shield includes a carrier which has an inner side which, in the mounted state, faces the component and on which a continuous insulating material is arranged, for the absorption of heat and sound which are produced by the component. The carrier has a plurality of apertures in order to reduce sound radiation of the carrier. The provided embodiment and arrangement of the apertures, and the arrangement of the insulating material on the inner side significantly improve the sound- and heat-insulating properties of the heat shield.

20 Claims, 1 Drawing Sheet

(58) Field of Classification Search
USPC .... 296/39.3, 39.1, 198, 191, 204, 208, 37.2;
428/98, 95, 99, 116, 121, 175, 81
See application file for complete search history.

(56) References Cited

U.S. PATENT DOCUMENTS

| | | | | |
|---|---|---|---|---|
| 2006/0202499 | A1* | 9/2006 | Blomeling | B60N 3/048 |
| | | | | 296/39.3 |
| 2008/0289902 | A1 | 11/2008 | Krus | |
| 2010/0233430 | A1 | 9/2010 | Malinek | |
| 2014/0265413 | A1* | 9/2014 | Demo | B60R 13/0815 |
| | | | | 296/39.3 |
| 2016/0059797 | A1* | 3/2016 | Fushiki | B60R 13/0815 |
| | | | | 296/39.3 |

FOREIGN PATENT DOCUMENTS

| | | |
|---|---|---|
| DE | 38 21 468 A1 | 12/1989 |
| DE | 203 16 050 U1 | 12/2003 |
| DE | 103 49 743 A1 | 6/2005 |
| DE | 10 2004 062 331 A1 | 6/2006 |
| DE | 10 2005 058 253 A1 | 6/2007 |
| DE | 20 2006 019 984 U1 | 7/2007 |
| DE | 10 2008 016 566 A1 | 10/2009 |
| EP | 1 671 847 A1 | 6/2006 |

OTHER PUBLICATIONS

German-language Written Opinion (PCT/ISA/237) issued in PCT Application No. PCT/EP2016/061790 dated Aug. 8, 2016 (five pages).

German-language Search Report issued in counterpart German Application No. 10 2015 210 413.3 dated Apr. 6, 2016 with partial English translation (11 pages).

Chinese-language Office Action issued in counterpart Chinese Application No. 201680012682.5 dated Dec. 29, 2018 with English translation (16 pages).

Chinese-language Office Action issued in counterpart Chinese Application No. 201680012682.5 dated Aug. 14, 2019 with English translation (16 pages).

\* cited by examiner

HEAT SHIELD FOR A HEAT- AND SOUND-RADIATING COMPONENT IN A MOTOR VEHICLE

CROSS REFERENCE TO RELATED APPLICATIONS

This application is a continuation of PCT International Application No. PCT/EP2016/061790, filed May 25, 2016, which claims priority under 35 U.S.C. § 119 from German Patent Application No. 10 2015 210 413.3, filed Jun. 8, 2015, the entire disclosures of which are herein expressly incorporated by reference.

BACKGROUND AND SUMMARY OF THE INVENTION

The present invention relates to a heat shield for a heat- and sound-radiating component in a vehicle.

In vehicles, in particular diesel vehicles, heat and sound are produced by the individual components thereof, such as the engine, the exhaust gas line or the like, and the heat and sound are discharged into the surroundings. In order to absorb the radiated heat, heat shields, also referred to as heat shield plates, are used. For acoustic reasons these plates are sometimes configured to be multilayered, but then they also radiate sound into the surroundings and in some situations even increase the sound power which is radiated as a whole.

An object of the invention is to provide an improved heat shield which has heat-insulating and sound-insulating properties which are as effective as possible.

This and other objects are achieved by a heat shield in accordance with embodiments of the invention.

The heat shield serves for shielding a heat- and sound-radiating component in a vehicle, in particular a diesel vehicle. The component is, for example, an exhaust gas manifold, exhaust gas line or engine. The heat shield has a carrier which has an inner side which, in the mounted state, faces the component. Accordingly, the carrier also has an outer side which is remote from the component. The carrier in this case extends, in particular, along a carrier surface which at least partially encloses the component. In particular, a continuous insulating material is arranged on the inner side for the absorption of heat and sound which are produced by the component, in particular during operation of the vehicle. In this case, the carrier has a plurality of apertures in order to reduce the sound radiation of the carrier.

One advantage achieved by the invention consists, in particular, in that the apertures in the otherwise, in particular, flat carrier advantageously influence the sound radiation behavior thereof. By way of the apertures, the vibration or even the frequency response behavior of the carrier is expediently modified such that at least the sound radiation in the frequency range detectable by humans is markedly reduced. Tests have confirmed that the carrier according to the invention with apertures exhibits a markedly improved acoustic behavior and thus is excited considerably less by incoming sound and in turn accordingly radiates less sound. The apertures additionally prevent, in particular, too great an absorption of heat by the carrier, whereby in turn the thermal load thereon is reduced. As a result, distortions which could lead to damage due to the load-bearing function of the carrier are advantageously avoided. Advantageously, therefore, the carrier primarily serves for retaining the insulating material and for mounting the heat shield on the vehicle, but absorption of heat and sound is carried out principally by the insulating material. As a result, in particular, a heat protection which is particularly effective acoustically is implemented as a whole.

A further advantage results, in particular, by the combination with the insulating material. This forms an insulating layer and at the same time expediently serves for sound-insulation and heat-insulation and thus represents, in particular, a multi-purpose or multi-function ply. As the insulating material is applied, in particular continuously, onto the carrier, i.e. substantially without gaps, and covers the apertures in the carrier, advantageously a continuous double insulating effect is also ensured, i.e. insulation relative to heat and sound. In principle, a multi-part design of the insulating material is also conceivable with a plurality of insulating portions. Preferably, in this case the inner side of the carrier is also substantially completely, i.e. continuously, covered by the insulating material.

Any unfavorable acoustic properties of the carrier which may remain have no effect or only a small effect, due to the advantageous attachment of the insulating material on the inner side, since any sound and any heat originating from the component are initially transferred to the insulating material. As a result, the sound input into the carrier is also markedly reduced and thus the sound insulation of the heat shield is considerably improved overall.

The carrier serves, in particular, as a mechanical holder for the insulating material and also for mounting the heat shield on the vehicle. In this case, the carrier is preferably produced from sheet metal, for example aluminum or sheet steel, and thus at the same time is sufficiently lightweight and cost-effective and sufficiently mechanically stable.

Appropriately, the carrier has a wall thickness ranging from 0.5 to 2 mm and, as a result, in particular may be cost-effectively produced as a deep-drawn part. The apertures are stamped in a particularly simple and cost-effective design.

For mounting on the vehicle, the carrier preferably has a plurality of mounting holes by way of which the carrier is fastened to the vehicle or directly to the component, for example screwed, plugged-in or riveted. In the region of the mounting holes, the insulating material is omitted and thus has corresponding holes for passing through fastening elements.

In particular, in the embodiment as a deep-drawn part the carrier appropriately has a carrier contour which is adapted to a contour of the component. The insulating material is then mounted on the inner side of the carrier, in particular also following the contour. This results in a particularly space-saving arrangement.

In principle, the use of a perforated sheet as a carrier is contemplated, since advantageous acoustic properties, in particular, are already achieved by the carrier not being designed over the entire surface but having a number of recesses. Preferably, however, by introducing the recesses, in particular in the form of apertures, which in particular are larger than conventional recesses in perforated sheets, as much material of the carrier as possible is removed in order to achieve correspondingly a particularly optimal acoustic effect. An upper limit thus creates, in particular, the mechanical stability of the carrier which generally reduces when the quantity of material is reduced. The shape and the size of the apertures are thus, in particular, dependent on the shape of the heat shield and the component to be shielded. Generally, the apertures are preferably selected so as to be as large as possible, whilst taking into account the mechanical stability of the carrier.

In a preferred embodiment, the apertures in each case have a size ranging from 5 cm², in particular 10 cm², up to 500 cm², in particular 100 cm². Such a carrier has a particularly advantageous frequency response behavior. The size of an aperture in this case is the surface covered in each case by an aperture. Preferably, the apertures are approximately the same size, i.e. they differ in particular in the size thereof by at most a factor of 5, in particular a factor of 2.

In an advantageous embodiment, the carrier has at least 2 and at most 30, in particular at most 15 apertures. In this manner, in particular it is ensured at the same time that the carrier has both advantageous acoustic properties and advantageous mechanical properties. Generally, the exact number of apertures is dependent on the overall size of the carrier and the component to be shielded. In one exemplary embodiment, the size of the total surface area is approximately 0.4 m² and approximately 20 to 30 apertures are incorporated in the carrier.

The insulating material is preferably a flexible material which is then advantageously mounted so as to be adapted in contour to the inner side of the carrier and thus results in a particularly space-saving embodiment of the heat shield. As insulating material, in particular, mineral fibers or a mineral non-woven fabric are particularly advantageous since thereby a particularly high insulating effect both for sound and for heat is achieved.

The insulating material is preferably applied, for example bonded or plugged-in or clamped, as a ply or thick layer with a layer thickness ranging from, for example, 1 to 3 cm on the inner side of the carrier.

In an advantageous variant, additionally the insulating material is at least partially applied on the outer side on the carrier, for example as fiber strips, in order to achieve in particular improved insulation at points of the component discharging particularly high levels of heat and sound. Alternatively or additionally, in this manner gaps resulting from mounting or tolerances are also covered by additional insulating material.

When using mineral fibers in order, in particular, to prevent a loss of fibers and generally a loss of insulating material, preferably a top ply is applied onto the insulating material on the inner side. The top ply serves, therefore, in particular as a protective sleeve and ensures that the material is held together, in particular with regard to a potentially high mechanical load during operation. In an advantageous development, the top ply is applied on both sides, i.e. both on the inner side facing the component and also on the outer side, i.e. facing the carrier.

In a preferred embodiment, the top ply is configured as a perforated sheet, mesh or grille. As a result, on the one hand, it is ensured that the insulating material is sufficiently held together and, on the other hand, also that sufficient sound and heat enter through the perforated sheet, mesh or grille and into the insulating material for the purpose of absorption. In this case, with the use of a perforated sheet, mesh or grille, in particular so-called acoustic short-circuits are produced, whereby the sound radiation is advantageously reduced. The perforated sheet, mesh or grille is produced, for example, from steel or aluminum and, for example, has a thickness ranging from 0.3 to 2 mm. The perforated sheet, mesh or grille additionally has a plurality of holes which appropriately in each case have a diameter of approximately 0.5 to 2 mm.

In particular for protecting the insulating material from moisture from the surroundings, in a preferred embodiment, a water repellent film is arranged between the carrier and the insulating material as protection against the ingress of water. The film, in particular, is directly applied to the insulating material, for example bonded thereon. Preferably, the film serves at the same time as an external top ply as already described above.

In order to ensure a particularly comprehensive protection against the ingress of water, the film is preferably configured to be continuous, i.e. in particular without perforations or holes, apart from in the region of the mounting holes.

As a whole in a preferred embodiment for the heat shield, therefore, starting from the component, the following multilayered construction is produced: a perforated sheet as the top ply, insulating material for the sound and heat absorption, film as protection against the ingress of water and, in particular, also as an external top ply, the carrier with apertures. This, in particular four-layered, construction advantageously combines all of the required functionalities of the heat shield in a particularly compact manner with at the same time particularly effective sound-insulating and heat-insulating properties.

In a further preferred embodiment, the carrier with apertures has a total surface area and the apertures have a common aperture surface which is at least 5%, preferably at least 30% and preferably at most 90%, in particular at most 80% of the total surface area. As a result, the carrier at the same time has both sufficient mechanical stability and also improved acoustic properties, in particular in the sense of improved frequency response behavior. The total surface area of the carrier is made up of the aperture surface, i.e. the sum of the individual aperture surfaces of each individual aperture and the remaining carrier surface which actually contains material and forms a type of framework or structure.

In an advantageous embodiment, the carrier extends in a longitudinal direction and the apertures are spaced apart from one another by braces, wherein the braces extend transversely to the longitudinal direction. Such a heat shield is particularly advantageous for elongated components. The carrier then has, in particular, a frame or a border, the braces extending therein in the manner of ribs transversely to the longitudinal direction and at the same time forming the apertures and being correspondingly spaced apart.

Generally, however, the arrangement of apertures and braces is dependent on the actual shape of the component and the extent of the carrier so that in an advantageous variant the braces do not all extend parallel to one another.

In one advantageous embodiment, at least two apertures are spaced apart from one another by a brace and the brace has a brace width which is between 0.5 and 5 cm. In this embodiment, the carrier which is produced, in particular, from sheet metal has particularly good stability whilst advantageously large apertures are produced. In particular, the brace has a brace width and the apertures measured in the same direction in each case have an aperture width, and the brace width is at least 10% and at most 30% of the aperture width.

Other objects, advantages and novel features of the present invention will become apparent from the following detailed description of one or more preferred embodiments when considered in conjunction with the accompanying drawings.

BRIEF DESCRIPTION OF THE DRAWINGS

Hereinafter, an exemplary embodiment of the invention is described in more detail with reference to the appended drawings. In each case, schematically in the drawings.

DETAILED DESCRIPTION OF THE DRAWINGS

Figure 1:
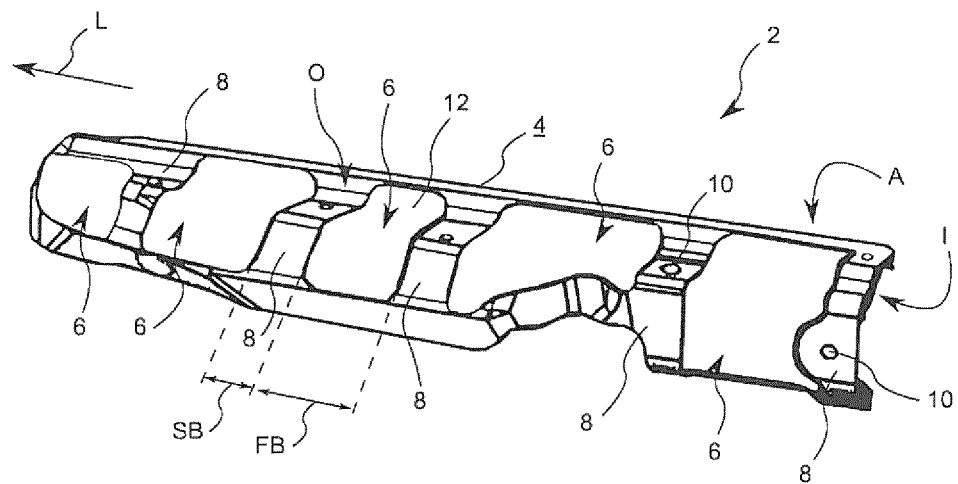
FIG. 1 is a perspective view of a heat shield.

Shown in FIG. 1 in an oblique view is a heat shield 2 which serves for the heat-insulation and sound-insulation of a component 3 in a vehicle (not shown). The heat shield 2 has a carrier 4 which extends in a longitudinal direction L and has a plurality of apertures 6, in this case five, arranged in succession in the longitudinal direction L. Due to the apertures 6, the carrier 4 has markedly improved acoustic response behavior, i.e. the transmission and discharge of sound from the component 3 via the carrier 4 is markedly reduced due to the apertures 6. The apertures 6 are spaced apart by a plurality of braces 8 extending transversely to the longitudinal direction L. For mounting the heat shield 2, a plurality of mounting holes 10 are additionally incorporated into the braces 8.

An insulating material 12 mounted on the inner side, i.e. on an inner side I of the carrier 4, is visible through the apertures 6. This is designed in the exemplary embodiment shown here as mineral non-woven fabric and has particularly good heat-insulating and sound-insulating properties, i.e. in particular heat-absorption and sound-absorption properties. The insulating material 12 is configured, in particular, to be continuous, i.e. it covers the inner side I fully with the exception of the mounting holes 10. The insulating material 12 thus covers the apertures 6 on the inner side and is retained by the braces 8 on the carrier 4. The insulating material 12 in the exemplary embodiment shown here is of one-piece configuration, but in an alternative, of multipart configuration (not shown).

The braces 8 have in each case, in the longitudinal direction L, a brace width SB which in this case approximately corresponds by 2 to 4 times to an aperture width FB of the apertures 6. In the exemplary embodiment shown here, the braces 8, in particular, have a brace width SB in the region of 1 to 5 cm, the aperture width FB is then correspondingly twice to four times the size, depending on the apertures 6. Overall, the apertures 6 in each case have a size in the region of 50 cm$^2$ to 100 cm$^2$ and thus form approximately 60% to 70% of a total surface area O of the carrier 4.

Figure 2:
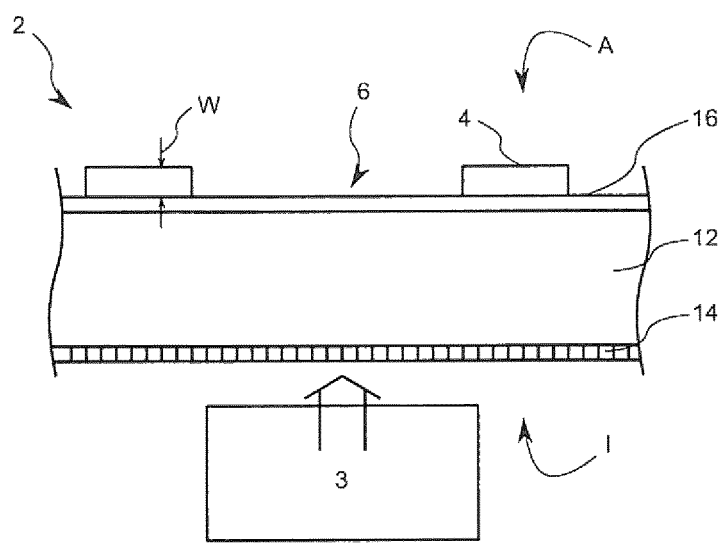
FIG. 2 is a cross-sectional view illustrating a layered construction of the heat shield.

FIG. 2 schematically shows the multilayered construction of the heat shield 2. The heat shield 2 is oriented such that the inner side I faces toward the heat- and sound-radiating component 3 and the outer side A faces away from the component 3 and toward the surroundings. Starting from the inner side I initially a top ply 14 is arranged as the innermost layer or ply which is applied to the subsequent insulating material 12, in order to hold this insulating material together and to avoid loss of fibers over time. In the exemplary embodiment shown here, the top ply 14 is configured as a perforated sheet and thus at the same time permits the insulating material 12 to be held together and the sound and heat which are radiated by the component 3 to enter in a particularly efficient manner. On the outer side a film 16 is applied onto the insulating material 12. The film 16 is water-repellent and serving as protection against the ingress of water, for protecting the insulating material 12 from moisture entering from the outside. The stack including the top ply 14, the insulating material 12 and the film 16 is finally applied on the inner side onto the externally arranged carrier 4. The carrier 4 in this case is produced from a metal sheet with a wall thickness W of approximately 1 mm. In FIG. 2 an aperture 6 which is delimited by two braces 8 of the carrier 4 is clearly visible.

LIST OF REFERENCE NUMERALS

2 Heat shield
3 Component
4 Carrier
6 Aperture
8 Brace
10 Mounting hole
12 Insulating material
14 Top ply
16 Film
A Outer side
FB Aperture width
I Inner side
L Longitudinal direction
O Total surface area
SB Brace width The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A heat shield for a heat- and sound-radiating component in a vehicle, the heat shield comprising:
   a carrier which has an inner side which, in a mounted state, faces the component and on which an insulating material is arranged, for absorption of heat and sound which are produced by the component,
   wherein the carrier has a plurality of apertures in order to reduce sound radiation of the carrier, and
   wherein the plurality of apertures are arranged such that the insulating material is visible from an outside of the carrier through the plurality of apertures.

2. The heat shield according to claim 1, wherein the plurality of apertures in each case have a size ranging from 5 to 500 cm$^2$.

3. The heat shield according to claim 1, wherein the carrier has at least 2 and at most 30 apertures.

4. The heat shield according to claim 2, wherein the carrier has at least 2 and at most 30 apertures.

5. The heat shield according to claim 1, wherein the insulating material is a flexible material.

6. The heat shield according to claim 5, wherein the flexible material is made of mineral fibers.

7. The heat shield according to claim 1, wherein a top ply is applied on the insulating material on an inner side, for holding together the insulating material.

8. The heat shield according to claim 6, wherein a top ply is applied on the insulating material on an inner side, for holding together the insulating material.

9. The heat shield according to claim 8, wherein the top ply is configured as a perforated sheet, mesh or grille.

10. The heat shield according to claim 1, wherein a water repellent film is arranged between the carrier and the insulating material.

11. The heat shield according to claim 8, wherein a water repellent film is arranged between the carrier and the insulating material.

12. The heat shield according to claim 11, wherein the film is configured to be continuous.

13. The heat shield according to claim 1, wherein the carrier has a total surface area and the plurality of apertures have a common aperture surface which is at least 5% of the total surface area.

14. The heat shield according to claim 13, wherein the common aperture surface is at least 30% of the total surface area.

15. A heat shield for a heat- and sound-radiating component in a vehicle, the heat shield comprising:
a carrier which has an inner side which, in a mounted state, faces the component and on which an insulating material is arranged, for absorption of heat and sound which are produced by the component,
wherein the carrier has a plurality of apertures in order to reduce sound radiation of the carrier, and
wherein the carrier extends in a longitudinal direction and the plurality of apertures are spaced apart from one another by braces, wherein the braces extend transversely to the longitudinal direction.

16. The heat shield according to claim 4, wherein the carrier extends in a longitudinal direction and the plurality of apertures are spaced apart from one another by braces, wherein the braces extend transversely to the longitudinal direction.

17. The heat shield according to claim 1, wherein at least two apertures are spaced apart from one another by a brace and the brace has a brace width which is between 0.5 and 5 cm.

18. The heat shield according to claim 16, wherein the braces have a brace width which is between 0.5 and 5 cm.

19. A heat shield for a heat- and sound-radiating component in a vehicle, the heat shield comprising:
a carrier which has an inner side which, in a mounted state, faces the component and on which an insulating material is arranged, for absorption of heat and sound which are produced by the component,
wherein the carrier has a plurality of apertures in order to reduce sound radiation of the carrier, and
wherein the carrier has a wall thickness ranging from 0.5 to 2 mm.

20. The heat shield according to claim 16, wherein the carrier has a wall thickness ranging from 0.5 to 2 mm.

* * * * *